US008024212B1

(12) United States Patent
McCroby Vinther

(10) Patent No.: US 8,024,212 B1
(45) Date of Patent: Sep. 20, 2011

(54) IMPLEMENTATION OF HANDS ON PROACTIVE STRATEGY

(76) Inventor: Pamla Jo McCroby Vinther, Cincinnati, OH (US)

( * ) Notice: Subject to any disclaimer, the term of this patent is extended or adjusted under 35 U.S.C. 154(b) by 1133 days.

(21) Appl. No.: 11/200,582

(22) Filed: Aug. 10, 2005

Related U.S. Application Data

(60) Provisional application No. 60/600,248, filed on Aug. 10, 2004, provisional application No. 60/674,599, filed on Apr. 25, 2005.

(51) Int. Cl.
*G06Q 10/00* (2006.01)
(52) U.S. Cl. ...................................... 705/7.26; 705/7.19
(58) Field of Classification Search .................. 705/7.19, 705/7.13, 7.26
See application file for complete search history.

(56) References Cited

U.S. PATENT DOCUMENTS

| 7,251,786 B2* | 7/2007 | Wynn et al. ................... 715/744 |
| 2004/0044544 A1* | 3/2004 | Smith et al. ....................... 705/1 |
| 2005/0004885 A1* | 1/2005 | Pandian et al. ................... 707/1 |

OTHER PUBLICATIONS

Ron Grohowski, Chris McGoff, Doug Vogel, Ben Martz, Jay Nunamaker, "Implementing Electronic Meeting System at IBM: Lessons Learned and Success Factors", Dec. 1990, Management Information Systems research Center, University of Minnesota, vol. 14, No. 4, 369-383.*

* cited by examiner

*Primary Examiner* — Beth V Boswell
*Assistant Examiner* — William Porter
(74) *Attorney, Agent, or Firm* — Wood, Herron & Evans, LLP

(57) ABSTRACT

HOPS™, which stands for "Hands On Proactive Strategy" is software and a business management method about making routine things happen routinely, and about having everyone be able to find the information they need, when they need it, to do the job they need to do. The solution to information sharing (and other closely related process) problems is an elegant set of software combined with behaviors that help the organization share information.

7 Claims, No Drawings

IMPLEMENTATION OF HANDS ON PROACTIVE STRATEGY

CROSS REFERENCE TO RELATED APPLICATIONS

This application claims benefit of provisional application Ser. No. 60/600,248 filed Aug. 10, 2004 and entitled HANDS ON PROACTIVE STRATEGY, and provisional application 60/674,599 filed Apr. 25, 2005 and entitled A POWERFUL NEW PRODUCTIVITY TOOL HOPS—HANDS ON PROACTIVE STRATEGY. Both of these prior applications are hereby incorporated herein by reference in their entirety.

FIELD OF THE INVENTION

The present invention relates to enterprise software for business administration.

BACKGROUND OF THE INVENTION

For decades people have struggled to complete the tasks assigned to them in the time provided. The problem is usually not ignorance of what is to be done. Neither is it unwillingness to do the assigned work in the prescribed time. The problem is the lack of proactive methods, practices, information and systems support.

In manufacturing, these matters have been addressed by the widely publicized Toyota Production System and its practices of Lean Production. In many professional settings and in white collar, administrative or clerical work, no such parallel systems, methodologies or processes exist. Instead, employees are drowning in a program du jour of piecemeal solutions, which may address some of the needs of the company, but do not satisfy the needs of the people doing the work.

Technology has made greater strides in the past decade than any other. More computers with more power are interconnected more effectively than ever before. Massive amounts of data are accessible at the desktops of virtually any company that chooses to have it that way. Yet, people complain about overload, stress and burnout. Productivity has grown dramatically in many industries, but in other segments of the economy—administrative and professional services, sales support, health care, legal, accounting, banking, etc.—productivity gains have been far less impressive.

A frequent problem is that information is not shared freely, and sometimes not shared at all. This lack of accurate, timely shared information is a huge problem for many organizations, since decisions are only as good as the knowledge/information on which they are based. The motives behind not sharing information are often not malicious, but are rooted in being too busy, following the wrong behaviors or struggling with inconvenient or unwieldy systems. Some people hoard information to fuel their need for power. Other information languishes unshared in the minds of employees or resides passively in the databases of the company. Flawed information leads to flawed plans, and no matter how precise the execution, flawed plans usually lead to failure. Ineffective follow-up or follow-through leads to unnecessary crises and emergencies. If the result of such behaviors and processes is not outright failure, then it is certainly a less satisfying kind of success.

Many organizations spend countless hours in meetings that do little more than "get everyone on the same page." Then there is the problem of taking action—timely, crisp and appropriate action following important contacts with customers, suppliers and other constituents.

In the latter 1990's companies raced to "reengineer", but often simply spread the same work among fewer people. The reengineered processes were still tangles; the necessary information to do the right things, in the right ways resided in the heads of a few people, many of whom were casualties of downsizing/early retirement. The result was systems that only provided what IT required—not what the users needed. Sticky notes, piecemeal programs and standalone systems on employees' PCs-systems are prevalent; these systems are unshared, unsupported and often not secure. Customers, suppliers, and employees are frustrated when planning/executing simple tasks fails, due to the lack of the right information, inadequate system support and most of all, the failure to follow the right interpersonal behaviors. Prompt, effective follow-through is the exception, not the rule.

Once again, this is not due to irresponsible people. Desktops and computer monitors covered with notes and reminders leaves people handling hundreds of voicemail and email messages each day in hopes of conveying or receiving the right information, coordinating the right actions and being responsive to peers, customers and suppliers.

Furthermore, every office has dozens or perhaps hundreds of "tickler files" residing in the desks of secretaries, assistants and junior level professionals, or on the ubiquitous personal computers resident on everyone's desktops. There are as many formats for "ticklers" as there are people devising them. Unless they are part of a integrated calendar management software suite, which most computers have but most users ignore, these reminder systems are random, fragmented and ineffective.

There is thus a need to improve upon management processes to avoid these continuing difficulties.

SUMMARY OF THE INVENTION

Manufacturing methods such as Lean Production, the Toyota Production System, Deming's Statistical Quality techniques, and cell technology, share a few success factors that are strikingly similar. All depend on open, liberal sharing of information. All depend on the willing cooperation of the workers involved in improving their own work methods and practices. All depend on partner-like relationships in the customer and supplier linkages and open communications; information sharing and actions based on prescribed best practices for given situations.

Popular concepts like "open book management" or "knowledge management," all rely on a single, predominant central theme-open sharing of the information that resides in the organization's collective knowledge. This sharing allows all employees to feel as though they are "in the know", meaning they have knowledge that is special and empowering.

HOPS™, which stands for "Hands On Proactive Strategy" is software and a business management method about making routine things happen routinely, and about having everyone be able to find the information they need, when they need it, to do the job they need to do. The solution to information sharing (and other closely related process) problems is an elegant set of software combined with behaviors that help the organization share information.

In a first aspect, in accordance with principles of the present invention, an information system integrates activities into the context of a best practice process, to systematically take what users feed of their "own" information into the system, and orchestrate the creation of additional information required of a best practice process. This approach provides benefits like the clarity and insights from everyone having done so.

In specific embodiments, the HOPS process utilizes templates for reminders, tasks and tickers that are easily accessible to all members of the organization, and which are linked to, and integrated with the master calendar, and individual department or local calendars. In addition, this system is integrated with templates for meeting minutes, meeting agenda templates, and customer and supplier information templates.

In accordance with principles of the invention, mission critical parts of doing business right are integrated, and business operates in "HOPScycles"—best practice cycles of activity—designed to connect specific "proacts" that are built into best-practice workflows.

As one example, it is commonly agreed that well-run meetings should have an agenda that is circulated in advance to the attendees. But far too few meetings meet this criterion. After a meeting, someone should publish minutes documenting agreed upon decisions, assignments, responsibilities and so forth. However, well written and timely minutes are the exception, not the rule. A HOPScycle that integrates meeting minutes and related documentation to calendar entries for the meeting, triggers this best practice in a way that existing systems have not.

In further specific embodiments of HOPScycles, "frame Agreements" of 1-2 year duration are created, and rolled over each Fall, enabling the foresight in management of overall organizational activity. Frame Agreements for both clients and vendors, make expensive and time-consuming efforts such as business travel more purposeful and productive by focusing activity. Furthermore, interaction is channeled to phone, fax or email, prior to face-to-face meetings to finalize agreements. Expenses are more readily projected.

The above and other objects and advantages of the present invention shall be made apparent from the accompanying drawings and the description thereof.

DETAILED DESCRIPTION OF SPECIFIC EMBODIMENTS

HOPS™ is a complete system that integrates best-practice processes with the important information buried in the minds and computers of the organization. It does this by providing methods, reminders, prompts, formats, templates, and a lot more. HOPS integrates and normalizes best practices, making them the rule and not the exception. And by doing so it provides benefits to all participants.

HOPS™ is not just a calendar or contact management system, nor is it a new kind of CRM system; it's not just a different sort of Data Warehouse either. HOPS™ isn't purely a meeting management system either; and implementing HOPS™ isn't what has been referred to as "process redesign" or "reengineering" either. HOPS™ is the best aspects of these and many more popular "modules" all integrated into a highly practical and user friendly system with its own unique set of methods and behaviors. For example, merely noting meetings and activities in calendars doesn't ensure that anyone actually pursues those activities in a systematic, streamlined manner, retrieving/using all of the knowledge within the organization, while achieving consensus from constituents. HOPS™ brings about a sort of coordinated collaboration, and makes it seem almost second nature to do things the HOPS™ way.

Key elements of the HOPS methodology are:
1) Simple documentation of every conversation, with email follow-up;
2) Agendas presented, in advance, of any/every meeting;
3) Minutes of Meetings, used to document any cooperation;
4) Pro-active marketing initiatives, that look 'outside the box' to explore what (more) value an organization has to offer its constituents;
5) "Frame Agreements"—establishing frameworks within which smaller allotments of work are conducted, so that a working Partnership—versus "a single task"—is established.

Embedded in HOPS™ software will be preprogrammed cycles of activity. These cycles will proactively entice users to input their insights, while facilitating the user's ability to handle their workload. HOPS™ terminology calls such proactive, scheduled task cycles 'proacts'.

The following words are used in the following description:
Entity—any individual with whom we/the organization interacts.
Entity group(s)—the group to which an entity belongs, such as Employees, Clients, Suppliers, Board Members, Investors, and Project teams. a Proact—the most effective process for a given activity.
HOPScycle—the cycle, comprised of a number of proacts, which ensures achieving a mutually desired goal with an entity.

Every interpersonal interaction recorded in HOPS™ software, such as a meeting, telephone call or correspondence, initiates a preprogrammed HOPScycle of proacts. These are arranged to reflect an organization's agreed most effective process of activity for achieving desired results. HOPScycles involve individual actions that are simple, yet strategically important, and the formatting of proacts makes the work fun and easy to do, by prompting users through a respective cycle to ensure interaction with any entity is comprehensive, mutually satisfying, and cohesive with their whole relationship to the organization.

Each interpersonal interaction is captured and tracked. These include:
1) Telephone calls, for which minutes are recorded, regardless of initiator.
2) Follow-up telefax or email is sent as confirmation to a phone call, when any item of importance is discussed and/or action-to-be-taken has been verbally agreed upon.
3) Prior to any meeting, a proposed agenda is sent by the person requesting the meeting.
4) For every 1st time meeting with a potential client, it is suggested that a point on the agenda reflects the suggestion to draft a "work paper"; during the second meeting, at latest, a frame agreement is presented for signature, forming the basis for a potential cooperation.
5) After every meeting, minutes are generated and sent to all participants by the sales-responsible person in attendance.
6) Every client partnership is initiated by a Frame Agreement of 1-2 years; these are rolled-over in 4th quarter of each fiscal year.
7) Any person in an organization who takes an external telephone call, remembers to note what is discussed.

Documentation of such activity is performed in a contact data form (CDF) or potential contact data form (PCDF).

The software supports forms which are automatically linked to activities in preceding forms, OR opened by clicking on headings (highlighted), as elaborated below:

CDS and PCDS=(Potential) Contact Data Sheet, containing basic data on the client company and/or individual customer with a link to their contact in our organization, as well as standard workprocess forms, described below. Opens automatically whenever the telephone rings, or on the user's initiation in the case of a personal conference.

OD/MS=Organisational Diagram/Mission Statement—Overview of a customer's organizational constellation. What their business is, and why they are doing it in the manner they have chosen.

WTWW=Who Talks With Whom—In depth, global organizational matrix.

HRC=Human Resource Calendar—Overview of each employee's schedule, rolling three months out: abbreviated by employee initials and department designation.

CS=Challenges Status—Quick brief on challenges occurring with customer.

PPC=Product Purchase Configuration—Overview of what customer purchases, and at what price. (Double-click is purchase history.)

PSC=Product Sold Configuration—Overview of what supplier sells, and to what price. (Double-click is our own purchase history.)

SCS=Solution Comparison Sheet—Portfolio of our product portfolio, with point of reference being clients' needs or desired benefits. Thereafter, comparison of our solution to other available, equivalent (as deemed by the competitor) products.

FA=Frame Agreements—Per company, all agreements/contracts entered into by both parties, inventoried LIFO.

HISTORY=Brief summary of relationship, from initial meeting to day's date; annual purchases figure, payment terms and payment pattern.

MCDS=Market Comparisons Data Sheet—Form completed for each customer, allowing HOPS™ software to generate market comparisons and identify trends relative to regional location, market segments, quantities purchased, and sales/marketing methods.

TM=Standard telephone minutes form

MA=Standard meeting agenda forms (MAP=Meet.Agendas Past/MAF=Meet.Agenda Future)

MM=Standard meeting minutes forms (MMP=Meeting Minutes Past)

FAX=Standard fax form which automatically pulls up appropriate title and number, when name entered (for cases where several different persons are addressed at the client company).

LETTER=Standard letter form which automatically pulls up appropriate title and address, when name entered (for cases where several different persons are addressed at the client company).

e-mail=Standard e-mail form which automatically pulls up appropriate title and address, when name entered (for cases where several different persons are addressed at the client company).

POT=Progress Over Time matrix

CC: function=Automatic option every time any of the above are executed—which "copies" via intranet, the action just taken to any internal user who should be made aware.

IRM/Q/A=Internal Reports Monthly, Quarterly, Annually+ECF=Earnings Calculation Form The linking of these forms is consistent with the "Eight Rules of Contact Management" inherent in HOPS™:

1) Meeting agendas must be sent a minimum of 5 working days prior to any meeting.

2) Meeting minutes must be sent a minimum of 10 working days after any meeting.

3) All telephone correspondence where issues are discussed and action decided must be followed up in writing, as to what was agreed upon, the same day via fax or e-mail.

HOPS™ will "nudge" users to follow the rules via following timeframes relating to prior activity:

a) Phone calls follow-up: with the same (you must write and send, immediately after a phone call; the system blocks all other activity).

b) Meeting agendas: reminder on 4 day countdown, and every day thereafter, until the last day: from log-on, forced to write/send agenda or system block occurs.

c) Meeting minutes: reminder on 6 day countdown, and every day thereafter, until the last day: from log-on, forced to write/send minutes or system block occurs.

d) Contracts: All contracted clients are listed from 1st September, with their respective contract date for planning rollover activity.

5) When a client is telephoned, the CDS or PCDS automatically appears; if there are any changes in client status, these must be revised with the same.

6) By knowing a customer or supplier's history, one is in a position to continue doing an excellent business so long as a Frame Agreement is mutually negotiated, signed, and lived up to with annual renewals, and serves as the backbone of the relationship.

7) Employees are valued resources which need clarity, regarding:

a) company expectations to them, and tools provided to support their achievement;

b) (minimum) area of responsibility and associated mandate; where can one grow; and c) cohesion in work done, to company's whole progress and profit.

If so managed, employees can become the strategic building blocks in their company environment, developing increased breadth, perspective, and skills over the years.

8) Commitment and Appreciation—necessary elements in all partnerships—should be insisted upon by all, towards all:

a) Customers, once they have heard what we shall do to serve them, shall be told what we need from them to be that strong supplier they value.

b) Suppliers, once we have ordered large(r) quantities over long, planned periods and accepted flexible terms of delivery, shall be told what we need from them to remain a strong customer they value.

c) Employees, once we have sold the attractive workplace our company provides them, shall be told what the company expects from them to remain the workplace they value, and what they can expect from the company relative to leadership and personal growth opportunity; and d) Executives (management), once they have understood their job profile, mandate, and their compensation plan, shall be told what is expected relative to their performance and precisely what added value they shall contribute to maintain their responsibility.

HOPS must be fed by users to work, and so must motivate behavioral change. The principle by which this is accomplished is simple. Most employees-at all levels of an organization-want to do a good job. Management often creates the obstacles that keep them from doing a good job. At the very least, management fails to remove such obstacles because it doesn't recognize them, or doesn't know how. Occasionally misguided information hoarders try to build their power base by not sharing information, and these offenders are also quickly exposed in a HOPS™ environment. Even the HOPS™ vocabulary cues the right behaviors when it uses action terms like "the standard proacts" (defining the normal action as proactive instead of reactive) to describe behaviors.

Experience has proven that whenever they are asked to do something different, or just to handle more work in the same or less time, people wonder-and often ask—"what's in it for me?" If the answer to that question is a good one, they buy into the change and make it work. And it is just that reason—"what's in it for them"—that makes HOPS™ popular with users. HOPS™ gives back as much, and usually far more than people put into it.

Beyond system prompting, peer pressure created by use of the HOPS system also encourages people in an organization to feed, use and share the HOPS™ knowledge base.

Thus, in accordance with the invention, an improved management process is facilitated by the HOPS software, leading to productivity gains and improved employee morale.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An information system for integrating information relating to meeting activities into the context of a best practice process, comprising computer hardware programmed to
   a. allocate fields in an integrated data store for one or more of a meeting time, a meeting agenda, meeting participants and meeting minutes;
   b. generate for display at least one first form for receiving information from a user regarding a personal meeting, the participants therein and the meeting times thereof;
   c. store information received in said first form in said integrated data store;
   d. incorporate the information received in said at least one first form in a first document regarding the personal meeting;
   e. generate for display second forms for prompting and receiving information from a participant in said personal meeting preparatory to and/or subsequent to the personal meeting identified in said at least one first form, the second form defining attributes of said personal meeting other than the participants and the time, the second forms being generated for display and receipt of information separately from the display of said at least one first forms;
   f. store information received in said second forms in said integrated data store;
   g. incorporate the information received in said second forms in a second document regarding the personal meeting;
   h. establish linkages between the at least one first form and said second forms;
   i. perform using said linkages and said information received by said at least one first form, the steps of:
      automatically and without human intervention requiring creation of additional information on attributes of said meeting other than the participants and the time with said second forms, by prompting and storing in said integrated data store, additional information from at least one of the participants in the meeting identified by said at least one first form, and
      requiring delivery of said additional information not later than a time that is prior to or subsequent to the meeting time identified by said at least one first form,
      the information system blocking access, use and all other activity of said information system unrelated to said additional information and said second forms, until said participant provides said additional information;
   j. link, integrate, and normalize said at least one first form and said second forms in a best practice cycle of activity wherein said best practice cycle of activity is a defined cycle of activity for a meeting and said at least one first form and said second forms comprise one or more of an agenda form that is circulated in advance of the meeting to the attendees, a minutes form documenting agreed upon decisions circulated after the meeting, and assignment forms identifying individual responsibilities; and
   wherein said best practice cycle of activity is based on rules of contact management comprising:
      meeting agendas must be sent a minimum of 5 working days prior to any meeting; and
      meeting minutes must be sent a minimum of 10 working days after any meeting.

2. The system of claim 1 wherein said at least one first form and said second forms comprise best practices templates for reminders, tasks and ticklers including standard telephone minutes form, standard meeting agenda forms, standard meeting minutes forms, standard fax form, standard letter form and standard e-mail form that are integrated with a calendar and accessible to all members of the organization.

3. The system of claim 2 wherein said calendar is one or more of a master calendar, a department calendar, a local calendar, or an individual calendar.

4. The system of claim 1 wherein said best practice cycle of activity for said personal meeting is linked to a calendar entry for the meeting, the information system triggering the at least one first, second forms for the personal meeting according to the link.

5. The system of claim 1 wherein said best practice cycle of activity is a cycle of activity for creating a frame agreement of specified duration, and rolling said agreement over to a new duration.

6. The system of claim 1 wherein said personal meeting includes one or more telephone participants.

7. The system of claim 1 wherein said personal meeting includes one or more participants who will attend in a common office space.

* * * * *